US006985475B2

(12) United States Patent
Lee

(10) Patent No.: US 6,985,475 B2
(45) Date of Patent: Jan. 10, 2006

(54) METHOD FOR IDENTIFYING BTS AND BSC IN IMT-2000 SYSTEM

(75) Inventor: Gye-Chool Lee, Ichon-shi (KR)

(73) Assignee: UTStarcom, Inc., Alameda, CA (US)

(*) Notice: Subject to any disclaimer, the term of this patent is extended or adjusted under 35 U.S.C. 154(b) by 860 days.

(21) Appl. No.: 09/843,354

(22) Filed: Apr. 26, 2001

(65) Prior Publication Data

US 2001/0055284 A1 Dec. 27, 2001

(30) Foreign Application Priority Data

Apr. 27, 2000 (KR) ........................................ 2000-22519

(51) Int. Cl.
*H04J 3/24* (2006.01)
*H04M 1/00* (2006.01)

(52) U.S. Cl. ........................................ 370/349; 455/560

(58) Field of Classification Search ................. 370/329, 370/349, 395.3, 395.31, 913; 455/456.1, 455/560, 561
See application file for complete search history.

(56) References Cited

U.S. PATENT DOCUMENTS

| | | | | | |
|---|---|---|---|---|---|
| 5,278,890 | A | * | 1/1994 | Beeson, Jr. et al. | 340/7.24 |
| 5,483,527 | A | | 1/1996 | Doshi et al. | |
| 5,483,537 | A | | 1/1996 | Dupuy | 370/95.3 |
| 5,493,286 | A | * | 2/1996 | Grube et al. | 340/7.25 |
| 5,513,183 | A | * | 4/1996 | Kay et al. | 370/337 |
| 5,513,379 | A | | 4/1996 | Benveniste et al. | 455/33.1 |
| 5,517,188 | A | | 5/1996 | Carroll et al. | 340/825.54 |
| 5,787,344 | A | | 7/1998 | Scheinert | 455/422 |
| 6,104,930 | A | | 8/2000 | Ward et al. | 455/450 |
| 6,345,053 | B1 | * | 2/2002 | Jeon | 370/441 |
| 6,351,647 | B1 | * | 2/2002 | Gustafsson | 455/466 |

(Continued)

FOREIGN PATENT DOCUMENTS

| | | |
|---|---|---|
| JP | 64016130 | 1/1989 |
| JP | 64068139 | 3/1989 |
| JP | 02309732 | 12/1990 |
| JP | 08065229 | 3/1996 |
| JP | 08191477 | 7/1996 |
| JP | 08223635 | 8/1996 |

(Continued)

OTHER PUBLICATIONS

Office Action from Korean Patent Applicant No. KR20000–0022519, dated Apr. 25, 2002, (with translation).

*Primary Examiner*—Hassan Kizou
*Assistant Examiner*—Hong Cho
(74) *Attorney, Agent, or Firm*—McDonnell Boehnen Hulbert & Berghoff LLP

(57) ABSTRACT

A method for allocating corresponding identity (ID) to each of a plurality of base station controllers (BSC) and each of a plurality of base transceiver stations (BTS) in an international mobile telecommunication-2000 (IMT-2000) system including the plurality of BSCS, the plurality of BTSs and an OMC (OMC=operating and maintenance center) for managing the plurality of BSCs and the plurality of BTSs includes the steps of: by the OMC, determining if system initialization is performed; if the system initialization is not performed, going to the step a), otherwise by the OMC, transmitting BSC ID allocation data to all the BSCs coupled to the OMC and allocating corresponding specific BSC identities (IDs) and corresponding group IDs to all BSCs; by each of the plurality of BSCs, receiving the BSC ID allocation data from the OMC and recognizing a corresponding specific BSC ID and a corresponding group ID allocated to each BSC by analyzing the BSC ID allocation data; by each of the plurality of BSCs, transmitting BTS ID allocation data to all BTSs coupled to each BSC and allocating corresponding specific BTS IDs to all the BTSs; and by each of the plurality of BTSs, receiving the BTS ID allocation data from the BSC and recognizing corresponding specific BTS IDs allocated to each BTS by analyzing the BTS ID allocation data.

10 Claims, 6 Drawing Sheets

U.S. PATENT DOCUMENTS

| | | | | | |
|---|---|---|---|---|---|
| 6,389,282 | B1 | * | 5/2002 | Hirsch | 455/423 |
| 6,442,384 | B1 | * | 8/2002 | Shah et al. | 455/423 |
| 6,501,746 | B1 | * | 12/2002 | Leung | 370/338 |
| 6,515,970 | B1 | * | 2/2003 | Lindsay et al. | 370/280 |
| 6,535,732 | B1 | * | 3/2003 | McIntosh et al. | 455/445 |
| 6,729,929 | B1 | * | 5/2004 | Sayers et al. | 455/446 |
| 6,766,168 | B1 | * | 7/2004 | Lim | 455/435.1 |
| 6,771,635 | B1 | * | 8/2004 | Vilander et al. | 370/349 |

FOREIGN PATENT DOCUMENTS

| | | |
|---|---|---|
| JP | 11196029 | 7/1999 |
| JP | 11346382 | 12/1999 |
| WO | 9901993 | 1/1999 |

* cited by examiner

METHOD FOR IDENTIFYING BTS AND BSC IN IMT-2000 SYSTEM

FIELD OF THE INVENTION

This invention relates to a method for identifying a base transceiver station (BTS) and a base station controller (BSC) in an international mobile telecommunication-2000 (IMT-2000) system; and more particularly, to method for identifying a BTS and a BSC in an IMT-2000 system based on software.

DESCRIPTION OF THE PRIOR ART

Allocating corresponding identities (IDs) to a plurality of subsystems included in a conventional mobile communication system, are performed by hardware, for example, equipping a base transceiver station (BTS) with a read only memory (ROM) wherein a specific ID to allocate to the BTS is stored.

Thus, it is not appropriate to produce the ROM on a large scale. Also, when the specific ID of the BTS is modified, it is unavoidable to replace the ROM with a new ROM.

Different from DCS/PCS modes wherein one or more BTSs in the conventional mobile communication system are operated interworking with one or more mobile switching centers (MSC), one or more BTSs in an international mobile telecommunication-2000 (IMT-2000) system are directly coupled to one or more OMC (OMC=operating and maintenance center). Accordingly, the OMC needs to identify a plurality of BTSs coupled thereto. However, because it is not performed to allocate corresponding specific identity (ID) to each BTS in the conventional mobile communication system, wherein the specific ID is used to identify the plurality of BTSs, it is not possible for the OMC to identify the plurality of BTSs by the conventional method.

SUMMARY OF THE INVENTION

It is an object of the present invention to provide a method for allocating corresponding identity (ID) to each of a plurality of base station controllers (BSC) and each of a plurality of base transceiver stations (BTS) in an international mobile telecommunication-2000 (IMT-2000) system to thereby manage the plurality of BSCs and the plurality of BTSs based on software without supplying the system with additional hardware.

In accordance with an aspect of the present invention, there is provided a method for allocating corresponding identity (ID) to each of a plurality of base station controllers (BSC) and each of a plurality of base transceiver stations (BTS) in an international mobile telecommunication-2000 (IMT-2000) system including the plurality of BSCs, the plurality of BTSs and an OMC (OMC=operating and maintenance center) for managing the plurality of BSCs and the plurality of BTSs, the method including the steps of: by the OMC, determining if system initialization is performed; if the system initialization is not performed, going to the step a), otherwise by the OMC, transmitting BSC ID allocation data to all the BSCs coupled to the OMC and allocating corresponding specific BSC identities (IDs) and corresponding group IDs to all BSCs; by each of the plurality of BSCs, receiving the BSC ID allocation data from the OMC and recognizing a corresponding specific BSC ID and a corresponding group ID allocated to each BSC by analyzing the BSC ID allocation data; by each of the plurality of BSCs, transmitting BTS ID allocation data to all BTSs coupled to each BSC and allocating corresponding specific BTS IDs to all the BTSs; and by each of the plurality of BTSs, receiving the BTS ID allocation data from the BSC and recognizing corresponding specific BTS IDs allocated to each BTS by analyzing the BTS ID allocation data.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
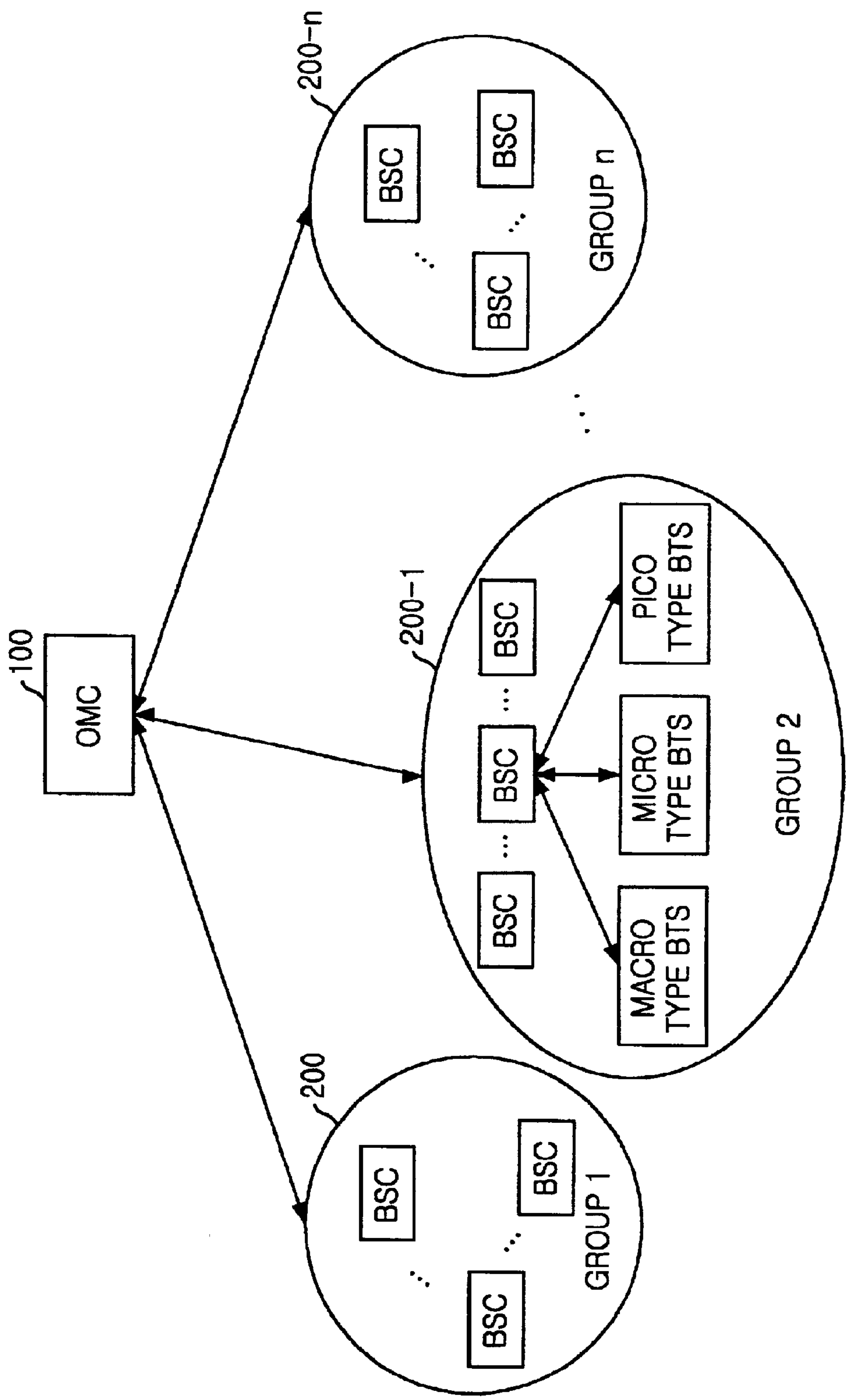
FIG. 1 is a block diagram illustrating an international mobile telecommunication-2000 (IMT-2000) system including a OMC, a plurality of base station controllers (BSC) and a plurality of base transceiver stations (BTS) in accordance with the present invention.

FIG. 1 is a block diagram illustrating an international mobile telecommunication-2000 (IMT-2000) system including a OMC, a plurality of base station controllers (BSC) and a plurality of base transceiver stations (BTS) in accordance with the present invention.

An OMC (OMC=operating and maintenance center) is coupled to a plurality of base station controllers (BSC) in an IMT-2000 system and also, each BSC is coupled to a plurality of base transceiver stations (BTS).

As shown FIG. 1, the OMC 100 can manage the plurality of BSCs and the plurality of BTSs included in each BSC by performing grouping of the plurality of BSCs in accordance with the present invention.

When the plurality of BSCs request the OMC 100 to allocating an identity (ID), the OMC 100 performs allocating corresponding specific IDs and group IDs to all BSCs to thereby manage the plurality of BSCs based on ID information.

The plurality of BSCs perform management of the plurality of BTSs coupled thereto and perform operations relevant to a call processing or the like. Upon initialization of the plurality of BSCs, each BSC receives corresponding specific IDs and group IDs from the OMC 100 and performs the operations relevant to the call processing or the like based on the received IDs.

When the BSC receives an ID allocation request from the plurality of BTSs that the BSC manages, the BSC performs allocating corresponding IDs to all BTSs and performs operations relevant to management of the plurality of BTSs.

Types of BTS include a macro type, a micro type and a pico type. Type information of each BTS is stored in internal memories of each BTS.

Upon initialization of the plurality of BTSs, each BTS receives corresponding specific IDs from the BSC coupled thereto and performs operations relevant to the call processing or the like based on the received IDs.

Figure 2:
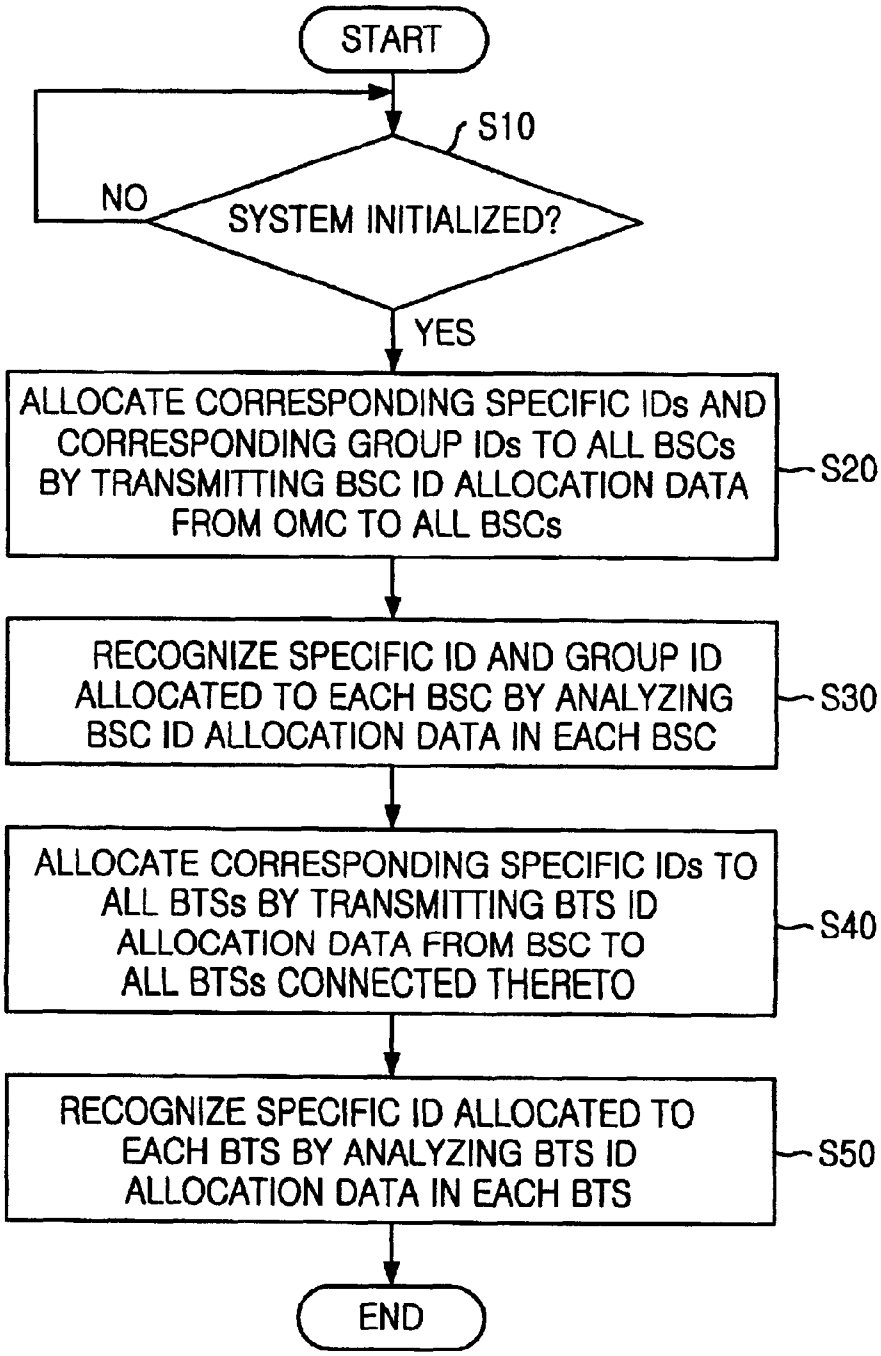
FIG. 2 is a flow chart illustrating a method for allocating corresponding identities to a BSC and a BTS in an IMT-2000 system in accordance with the present invention.

FIG. 2 is a flow chart illustrating a method for allocating corresponding identities to a BSC and a BTS in an IMT-2000 system in accordance with the present invention.

At the step S10, the OMC (OMC=operating and maintenance center) 100 determines if system initialization is performed, and if not, the logic flow returns to the step S10, otherwise proceeds to step S20.

At the step S20, the OMC 100 transmits BSC ID allocation data to all BSCs coupled thereto to thereby perform allocating corresponding specific IDs and group ID to all the BSCs.

At the step S30, when the plurality of BSCs receive the BSC ID allocation data from the OMC 100, each BSC recognizes the specific IDs and group IDs allocated thereto by analyzing the BSC ID allocation data and then performs operations relevant to a call processing or the like based on the allocated specific IDs and group IDs.

At the step S40, the plurality of BSCs transmit BTS ID allocation data to all BTSs coupled thereto to thereby perform allocating corresponding specific IDs and group ID to all the BTSs.

At the step S50, each of the plurality of BTSs recognizes its type by reading out type information stored in an internal memory thereof, recognizes specific IDs allocated to each by analyzing the BTS ID allocation data and then performs operations relevant to a call processing or the like based on the allocated specific IDs.

Figure 3:
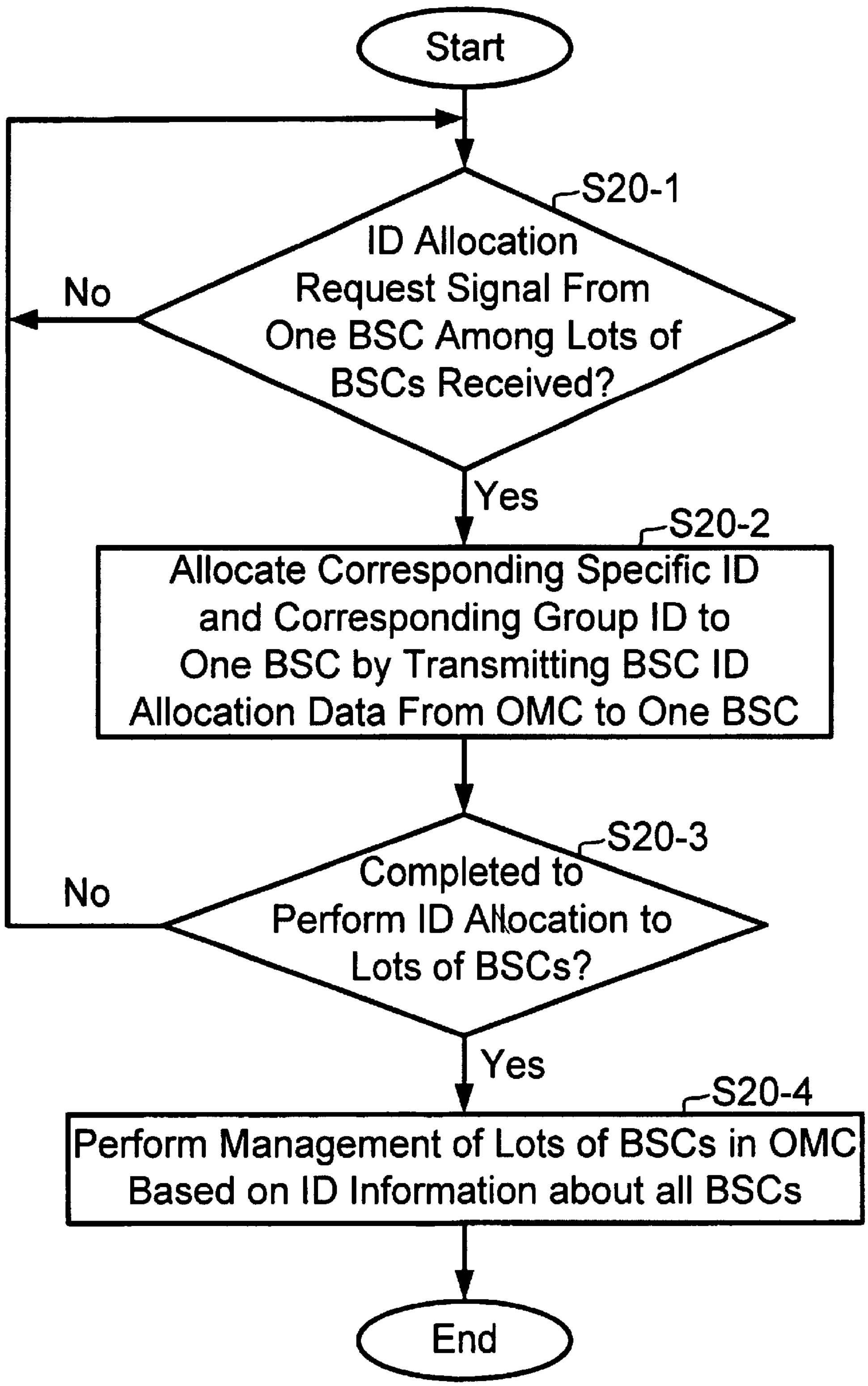
FIG. 3 is a flow chart illustrating in detail substeps included in step S20 shown in FIG. 2 in accordance with the present invention.

FIG. 3 is a flow chart illustrating in detail substeps included in step 20 shown in FIG. 2 in accordance with the present invention.

Figure 4:
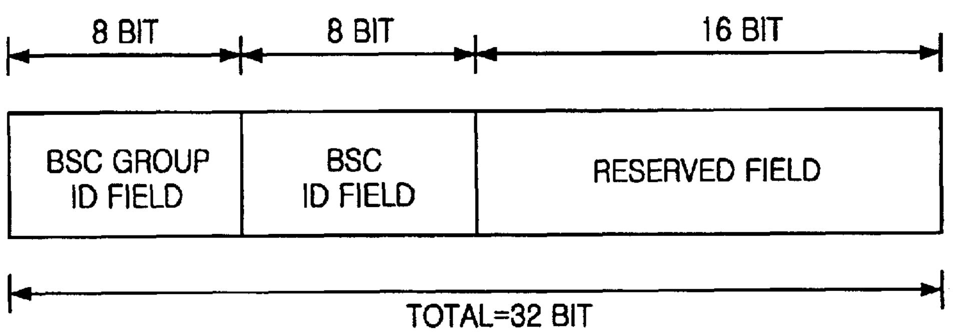
FIG. 4 shows a structure of BSC ID allocation data to which an OMC transmits to a plurality of BSCS.

FIG. 4 shows a structure of BSC ID allocation data to which a OMC transmits to a plurality of BSCs.

Referring to FIG. 3 and FIG. 4, at the step S20-1, the OMC (OMC=operating and maintenance center) 100 determines if an ID allocation request is received from one of a plurality of BSCs, and if not, the logic flow returns to the step S20-1, otherwise proceeds to step S20-2.

At the step S20-2, the OMC 100 transmits BSC ID allocation data to the BSC to thereby allocate a specific ID and a group ID.

A structure of the BSC ID allocation data is as shown in FIG. 4. That is to say, the BSC ID allocation data includes total 32 bits including 8 bits for a BSC group ID field, 8 bits for a BSC ID and 16 bits for a reserved field.

At the step S20-3, the OMC 100 determines if it is completed to perform ID allocation operations for the plurality of BSCs, and if not, the logic flow returns to the step S20-1, otherwise the logic flow proceeds to step S20-4.

At the step S20-4, the OMC 100 performs managing the plurality of BSCs based on ID information about all the BSCs.

Figure 5:
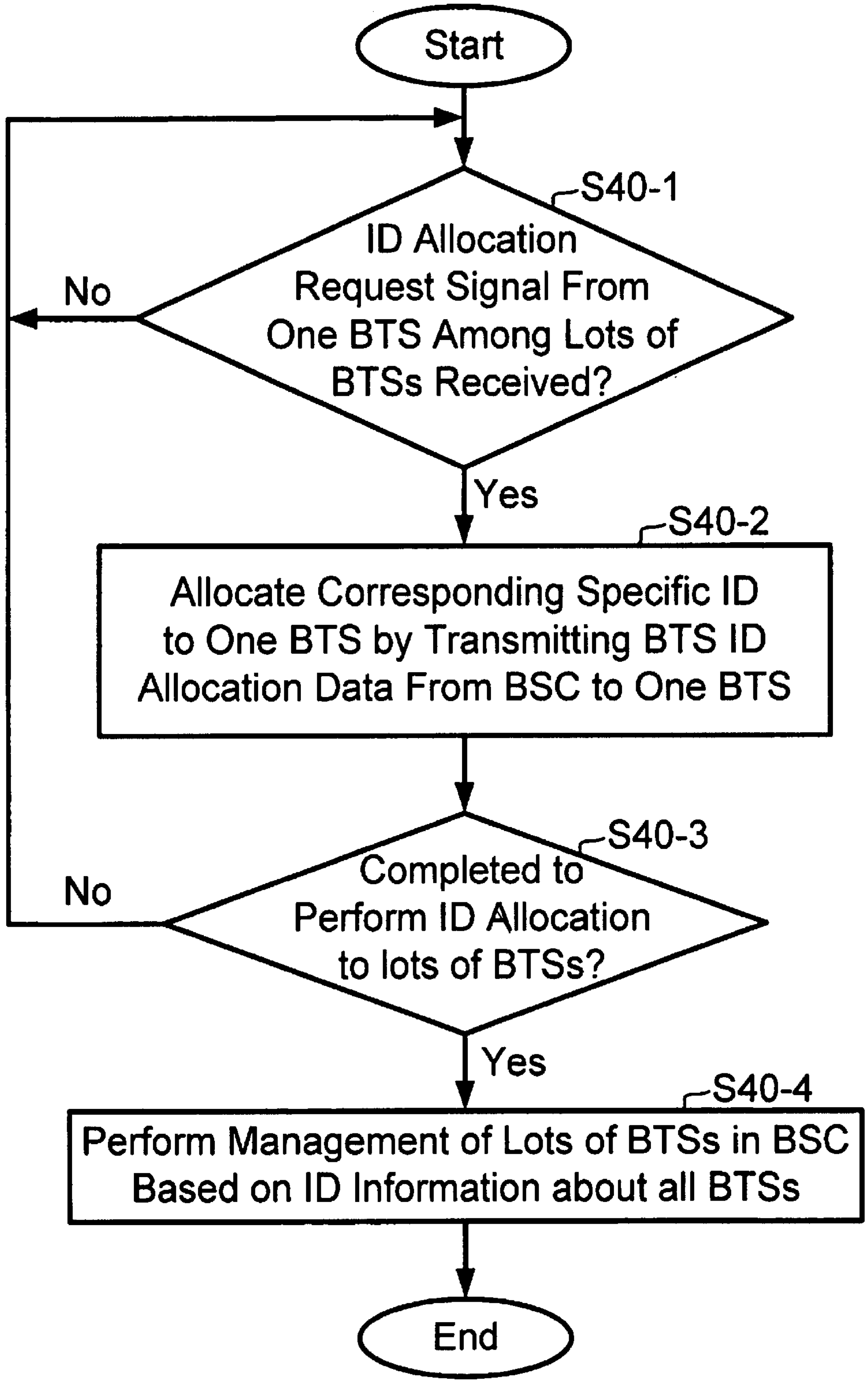
FIG. 5 is a flow chart illustrating in detail substeps included in step S40 shown in FIG. 2 in accordance with the present invention.

FIG. 5 is a flow chart illustrating in detail substeps included in step 40 shown in FIG. 2 in accordance with the present invention.

Figure 6:
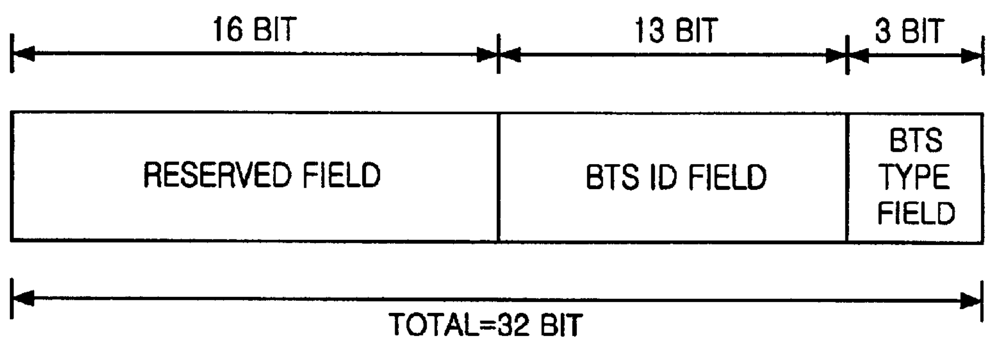
FIG. 6 shows a structure of BTS ID allocation data to which a BSC transmits to a plurality of BTSs.

FIG. 6 shows a structure of BTS ID allocation data to which a BSC transmits to a plurality of BTSs.

Referring to FIG. 5 and FIG. 6, at the step S40-1, each of the plurality of BSCs determines if an ID allocation request is received from one of a plurality of BTSs coupled thereto, and if not, the logic flow returns to the step S40-1, otherwise proceeds to step S40-2.

At the step S40-2, each BSC transmits BTS ID allocation data to the BTS to thereby allocate a specific ID.

A structure of the BTS ID allocation data is as shown in FIG. 6. That is to say, the BTS ID allocation data includes a total of 32 bits including 16 bits for a reserved field, 13 bits for a BTS group ID field and 3 bits for a BTS type field.

At the step S40-3, each BSC determines if it is completed to perform ID allocation operations for the plurality of BTSs coupled thereto, an if not, the logic flow returns to the step S40-1, otherwise the logic flow proceeds to step S40-4.

At the step S40-4, each BSC performs managing the plurality of BTSs coupled thereto based on ID information about all the BTSs.

In accordance with the present invention, when allocating identities to a plurality of BSCs and a plurality of BTSs in an IMT-2000 system, allocating the identities (ID) can be simply performed by software without adding or changing hardware.

Accordingly, it is not necessary to install additional read only memories (ROM) in the plurality of BTSs to thereby reduce production cost and also, it is easily performed to modify specific IDs allocated to each BTS.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for allocating corresponding identity (ID) to each of a plurality of base station controllers (BSC) and each of a plurality of base transceiver stations (BTS) in an international mobile telecommunication-2000 (IMT-2000) system including the plurality of BSCs (BSC=base station controller), the plurality of BTSs and an OMC (OMC=operating and maintenance center) for managing the plurality of BSCs and the plurality of BTSs (BTS=base transceiver station), the method comprising the steps of:

a) by the OMC, determining if system initialization is performed;

b) if the system initialization is not performed, going to the step a), otherwise by the OMC, transmitting BSC ID allocation data to each of the plurality of BSCs and allocating corresponding specific BSC identities (IDs) and corresponding BSC group IDs to each of the plurality of BSCs;

c) by each of the plurality of BSCs, receiving the BSC ID allocation data from the OMC and recognizing a corresponding specific BSC ID and a corresponding BSC group ID allocated to each BSC by analyzing the BSC ID allocation data;

d) by each of the plurality of BSCs, transmitting BTS ID allocation data to all BTSs coupled to each BSC and allocating corresponding specific BTS IDs to all the BTSs; and e) by each of the plurality of BTSs, receiving the BTS ID allocation data from the BSC and recognizing corresponding specific BTS IDs allocated to each BTS by analyzing the BTS ID allocation data.

2. The method as recited in claim 1, wherein the step b) includes the steps of:

b1) by the OMC, determining if an ID allocation request signal is received from one of the plurality of BSCs;

b2) if the ID allocation request signal is not received, going to the step b1), otherwise transmitting the BSC ID allocation data to the BSC that sent the ID allocation request signal and allocating a corresponding specific BSC ID and a corresponding BSC group ID to the BSC that sent the ID allocation request signal;

b3) determining if it is completely performed to allocate corresponding specific BSC IDs and corresponding BSC group IDs to all of the plurality of BSCs; and b4) if it is not completely performed to allocate the corresponding specific BSC IDs and the corresponding BSC group IDs to all of the plurality of BSCs, going to the step b1), otherwise the OMC performing management of the plurality of BSCs based on the specific BSC IDs and the group IDs that are allocated to the plurality of the BSCs.

3. The method as recited in claim 2, wherein the BSC ID allocation data are represented with 32 bits that include 8 bits for representing a BSC group ID field, 8 bits for representing a BSC ID field and 16 bits for representing a reserved field.

4. The method as recited in claim 1, wherein the step d) includes the steps of:

d1) by each of the plurality of BSCs, determining if an ID allocation request signal is received from one of the plurality of BTSs coupled thereto;

d2) if the ID allocation request signal is not received, going to the step d1), otherwise transmitting the BTS ID allocation data to the BTS that send the ID allocation request signal and allocating a corresponding specific BTS ID to the BTS that sent the ID allocation request signal;

d3) determining if it is completely performed to allocate corresponding specific BTS IDs to all of the plurality of BTSs coupled thereto; and d4) if it is not completely performed to allocate the corresponding specific BTS IDs to all of the plurality of BTSs, going to the step d1), otherwise the plurality of BSCs performing management of the plurality of BTSs based on the specific BTS IDs that are allocated to the plurality of the BTSs.

5. The method as recited in claim 4, wherein the BTS ID allocation data are represented with 32 bits that include 13 bits for representing a BTS ID field, 3 bits for representing a BTS type field and 16 bits for representing a reserved field.

6. The method of claim 5, wherein the BTS ID field comprises a BTS Group ID field.

7. The method as recited in claim 1, wherein step b) includes the steps of:

b1) by the OMC, determining if an ID allocation request signal is received from one of the plurality of BSCs;

b2) if the ID allocation request signal is not received, going to step b1), otherwise transmitting BSC ID allocation data to the BSC that sent the ID allocation request signal and allocating a corresponding specific BSC ID and a corresponding BSC group ID to the BSC that sent the ID allocation request signal;

b3) determining if a corresponding specific BSC ID and a corresponding BSC group ID have been allocated to each BSC of the plurality of BSCs; and b4) if corresponding specific BSC IDs and corresponding BSC group IDs have not been allocated to all BSCs of the plurality of BSCs, going to step b1), otherwise of the plurality BSCs performing call processing based on the specific BSC IDs and the group IDs allocated to the plurality of the BSCs.

8. The method as recited in claim 1, wherein the step d) includes the steps of:

d1) by each of the plurality of BSCs, determining if an ID allocation request signal is received from one of the plurality of BTSs;

d2) if the ID allocation request signal is not received, going to step d1), otherwise transmitting BTS ID allocation data to the BTS that sent the ID allocation request signal and allocating a corresponding specific BTS ID to the BTS that send the ID allocation request signal;

d3) determining if corresponding specific BTS IDs have been allocated to all BTSs of the plurality of BTSs; and d4) if corresponding specific BTS IDs have not been allocated to BTSs of the plurality of BTSs, going to step d1), otherwise the plurality of BTSs performing call processing based on the specific BTS IDs allocated to each of the plurality of the BTSs.

9. The method as recited in claim 8, wherein the step d4) further comprises:

each BTS of the plurality of BTSs reading BTS-type information so as to recognize itself a a particular type of BTS, wherein each BTS read BTS-type information stored therein.

10. The method of claim 9, wherein the particular type of BTS is selected from the group consisting of: (i) a macro-type BTS, (ii) a micro-type BTS, and (iii) a pico-type BTS.

* * * * *